J. A. ANTUNES.
Coffee-Pot.
No. 210,483.  Patented Dec. 3, 1878.
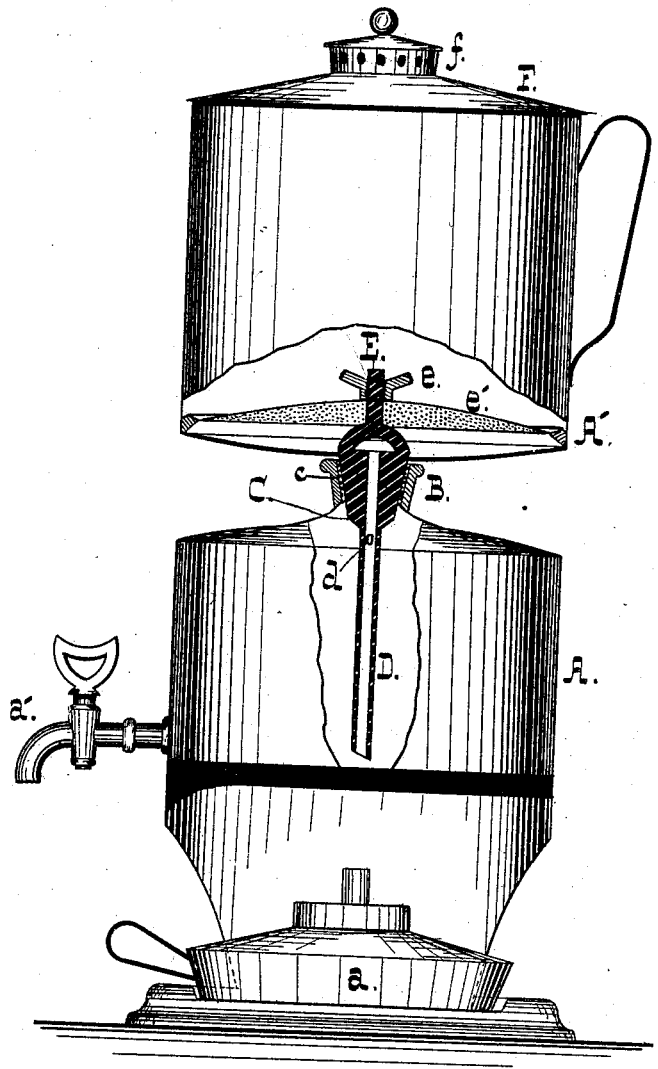

UNITED STATES PATENT OFFICE.

JOSE ANTONIO ANTUNES, OF RIO DE JANEIRO, BRAZIL, ASSIGNOR TO JOHN W. COACHMAN; SAID COACHMAN ASSIGNOR OF ONE-HALF HIS RIGHT TO JOHN W. SELBY, OF BALTIMORE, MARYLAND.

IMPROVEMENT IN COFFEE-POTS.

Specification forming part of Letters Patent No. 210,483, dated December 3, 1878; application filed October 8, 1878.

*To all whom it may concern:*

Be it known that I, JOSE ANTONIO ANTUNES, of the city of Rio de Janeiro, Empire of Brazil, have invented certain new and useful Improvements in Coffee-Pots; and I hereby declare the same to be fully, clearly, and exactly described as follows, reference being had to the accompanying drawings, in which the said device is illustrated.

This invention relates to apparatus for making decoctions or infusions of coffee or similar substances; and it consists in a device for effecting that end, constructed as hereinafter described, and possessing points of novelty indicated in the claims.

In the accompanying drawings, A represents a vessel mounted upon a suitable base, and provided with a removable spirit-lamp, $a$. The vessel A is furnished with a faucet, $a'$, and neck B, the latter being preferably conical internally and turned or ground true and smooth.

A second vessel, $A'$, is adapted to be mounted upon the vessel A, as shown, and is provided upon its bottom with a stopper, C, having a suitable packing-ring, $c$, and terminating in a tube, D, of a length to reach nearly to the bottom of the vessel A when the stopper C is forced into the neck B. A minute perforation, $d$, is formed in the tube D, the function of which will be hereinafter referred to.

Upon the bottom of the vessel $A'$ is secured a screw-rod, E, adapted to enter a thumb-nut, $e$, attached to a strainer, $e'$, which latter may thereby be drawn close against the bottom of the vessel.

The vessel $A'$ is furnished with a lid, F, having a perforated cap, $f$, as shown; and a cap is also provided for the neck B.

The operation of the device is as follows: A portion of coffee, or other substance of which it is desired to prepare an infusion, being placed in the vessel $A'$, the lower vessel, A, is filled with water, which is caused to boil by means of the lamp $a$. The vapor at first formed as the water is heated passes through the hole $d$ into the pipe D, and thence into the vessel $A'$. The coffee or other substance therein is thereby softened and caused to swell, preparing it for the subsequent action of the boiling water. As the water approaches the boiling-point the evolution of vapor increases until, when actually boiling, the hole $d$ is not sufficiently large to admit of the passage of the steam as fast as it is formed. As a consequence, the water in the vessel A is forced upward through the pipe D and into the vessel $A'$. As soon as the water is completely driven out of the vessel A the lamp is removed, and upon the condensation of the steam within the vessel a partial vacuum is formed therein, causing the liquid in the vessel $A'$ to percolate back to the lower vessel through the strainer $e'$.

This operation may be repeated should the infusion not possess the desired strength, though in the case of coffee a second boiling somewhat impairs the flavor.

When the operation is complete the vessel $A'$ is removed, the cap $f'$ being placed on the neck B, and the coffee or other infusion is drawn off as desired through the faucet $a'$.

What I claim is—

1. In combination with the vessel A, having neck B, the vessel $A'$, having plug C, tube D, laterally perforated, and strainer $e'$, as set forth.

2. In combination with the vessel $A'$, having packed stopper B, the rod E, strainer $e'$, nut $e$, and boiler A, substantially as described.

Witness my hand this 21st day of August, 1878.

JOSE ANTONIO ANTUNES.

Witnesses:
  JOAGM. FERREIRA MARTIN,
  FERNANDO D'ASILEZ CARÉ.